United States Patent
Tran

(10) Patent No.: US 7,475,231 B2
(45) Date of Patent: Jan. 6, 2009

(54) LOOP DETECTION AND CAPTURE IN THE INSTRUCTION QUEUE

(75) Inventor: Thang Minh Tran, Austin, TX (US)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 11/273,691

(22) Filed: Nov. 14, 2005

(65) Prior Publication Data

US 2007/0113059 A1   May 17, 2007

(51) Int. Cl.
G06F 9/42 (2006.01)
(52) U.S. Cl. ...................................... 712/241
(58) Field of Classification Search ................. 712/241, 712/233, 238, 239
See application file for complete search history.

(56) References Cited

U.S. PATENT DOCUMENTS

| | | | | |
|---|---|---|---|---|
| 5,375,238 A * | 12/1994 | Ooi | ............................. | 712/241 |
| 5,710,913 A * | 1/1998 | Gupta et al. | ................ | 712/241 |
| 5,951,679 A * | 9/1999 | Anderson et al. | ........... | 712/241 |
| 6,145,076 A * | 11/2000 | Gabzdyl et al. | .............. | 712/241 |
| 6,263,427 B1 * | 7/2001 | Cummins et al. | ........... | 712/236 |
| 6,401,196 B1 * | 6/2002 | Lee et al. | ..................... | 712/241 |
| 6,418,531 B1 * | 7/2002 | Nakahara | ..................... | 712/241 |
| 6,438,682 B1 * | 8/2002 | Morris et al. | ................ | 712/241 |
| 6,470,492 B2 * | 10/2002 | Bala et al. | .................... | 717/128 |
| 6,813,704 B1 * | 11/2004 | Nguyen | ....................... | 712/214 |
| 6,961,872 B2 * | 11/2005 | Yamamoto et al. | ............ | 714/34 |
| 7,010,676 B2 * | 3/2006 | Busaba et al. | ................ | 712/239 |
| 7,136,992 B2 * | 11/2006 | Maiyuran et al. | ........... | 712/241 |
| 7,155,570 B1 * | 12/2006 | Singh et al. | ................. | 711/118 |
| 2003/0074546 A1 * | 4/2003 | Hiraki et al. | ................ | 712/241 |

* cited by examiner

Primary Examiner—Eric Coleman
(74) Attorney, Agent, or Firm—Ronald O. Neerings; Wade James Brady, III; Frederick J. Telecky, Jr.

(57) ABSTRACT

A system and a method to identify a conditional branch instruction having a program counter and a target address, and increment a loop count each time the program counter and the target address equal a stored program counter and a target address. The system and method additionally includes assignment of a start loop pointer and an end loop pointer, based on an offset, when the loop count is equal to a threshold value, and capturing instructions for a loop, as defined by the start loop pointer and the end loop pointer, in an instruction queue.

19 Claims, 3 Drawing Sheets

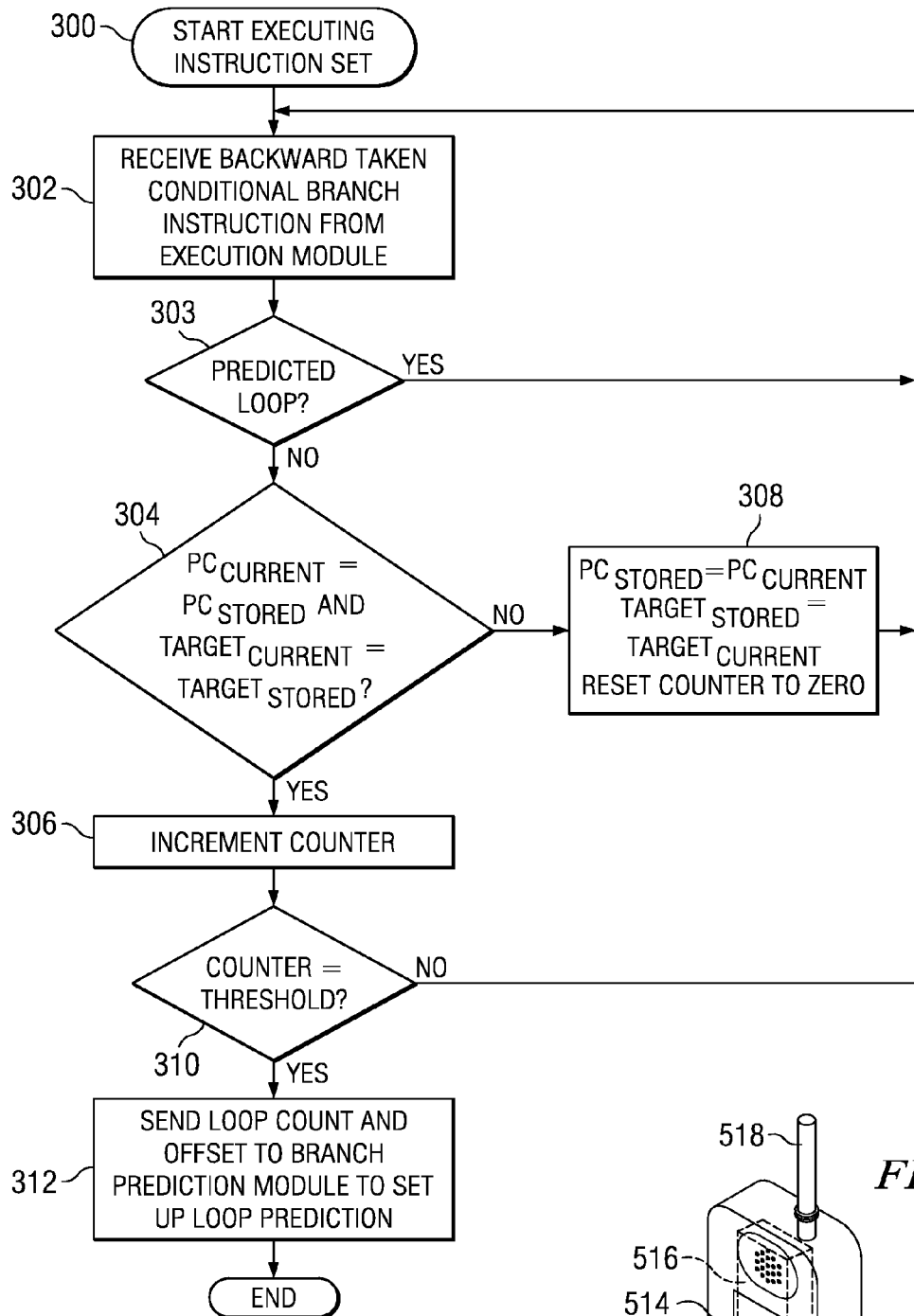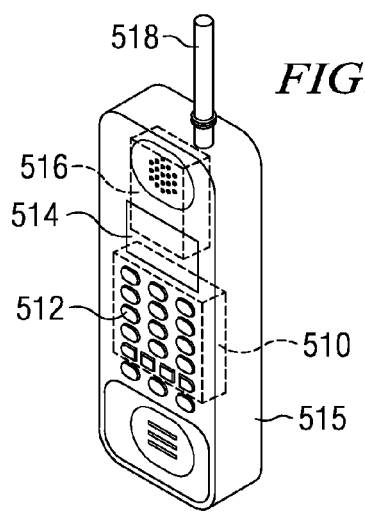

LOOP DETECTION AND CAPTURE IN THE INSTRUCTION QUEUE

BACKGROUND

1. Technical Field

The present subject matter relates to increasing code efficiency to extend battery life. More particularly, the subject matter relates to a system and method for detection of loops and capture in an instruction queue.

2. Background Information

Battery-operated systems, such as wireless devices (e.g., personal digital assistants, mobile phones), contain processors. Processors, in turn, store machine-executable code (e.g., software). A processor executes some or all portions of the machine-executable code to perform some or all of the functions of the battery-operated system. For example, in a mobile phone a processor may execute code that causes the mobile phone to play an audible ring tone or display a particular graphical image. Because battery-operated systems operate on a limited supply of power from the battery, it is desirable to increase or optimize the efficiency of code execution such that battery life is extended.

Loops are commonly used in programming for the sake of efficiency. A loop may contain syntax that reflects the beginning of the loop, such as a "for" or "while" statement. Alternatively, a non-syntactical loop may exist when a conditional branch instruction branches back to the same address a number of times, wherein the conditional branch instruction is the end of the loop, and the address targeted repeatedly is the beginning of the loop. Without a specific loop instruction, instructions in a non-syntactical loop are inefficiently fetched multiple times and stored in the instruction cache. In this way, the instruction fetch unit consumes a significant percentage of the power used by the microprocessor. Thus, it is desirable to effectively detect non-syntactical loops and handle them efficiently.

SUMMARY

The problems noted above are addressed in large part by a system and method for loop detection and capture in the instruction queue. Some illustrative embodiments may include a system, comprising a pipeline in which a plurality of instructions are processed, an execution unit coupled to the pipeline, an instruction cache coupled to the pipeline, a branch prediction module, a fetch unit, coupled to the pipeline, for placing instructions for a loop in an instruction queue, and detection logic, coupled to the pipeline. The detection logic is for identifying a conditional branch instruction having a program counter and an offset address, incrementing a loop count when the program counter and the target address equal a stored program counter and a stored target address, and detecting a loop when the loop count equals a threshold value.

Other illustrative embodiments may include a processor comprising memory, a fetch logic for fetching one or more instructions from the memory, an instruction queue for receiving one or more loop instructions, an execution unit for executing a loop from the instruction queue, detection logic for detecting a loop in the plurality of instructions when a loop counter equals a threshold value. The detection logic comprises branch prediction logic for identifying one or more conditional branch instructions, each conditional branch instruction having a program counter and a target address, and increment logic adapted increment the loop counter when the program counter and the target address are equal to a stored program counter and a stored target address.

Yet further illustrative embodiments may include a method comprising identifying a conditional branch instruction having a program counter and a target address, incrementing a loop count each time the program counter and the target address equal a stored program counter and a stored target address, assigning an offset to start of the loop when the loop count is equal to a threshold value, and capturing instructions for a loop in an instruction queue, the loop defined by the start loop pointer and the end loop pointer.

BRIEF DESCRIPTION OF THE DRAWINGS

For a detailed description of the preferred embodiments of the invention, reference will now be made to the accompanying drawings in which:

FIG. 3 illustrates a flow diagram of a technique for detecting and handling a loop described herein, in accordance with at least some embodiments;

FIG. 5 illustrates a wireless device that may contain the processor system of FIG. 2, in accordance with embodiments of the present disclosure.

NOTATION AND NOMENCLATURE

Figure 1:
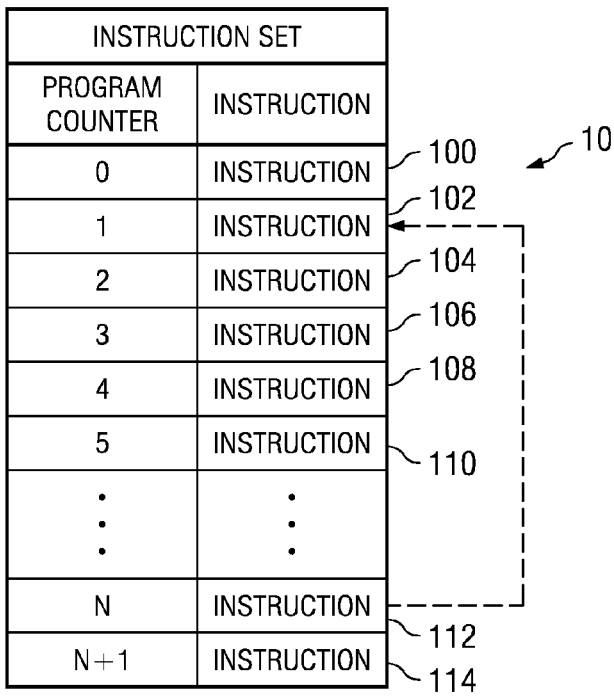
FIG. 1 illustrates a series of instructions on which the technique described herein may be implemented, in accordance with embodiments of the present disclosure.

Certain terms are used throughout the following discussion and claims to refer to particular system components. This document does not intend to distinguish between components that differ in name but not function.

In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Additionally, the term "system" refers broadly to a collection of two or more components and may be used to refer to an overall system as well as a subsystem within the context of a larger system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

A processor system generally stores instructions in an instruction cache prior to processing the instructions. When the processor is ready to process the instructions, the instructions are fetched from the instruction cache and are transferred to a pipeline. The pipeline generally is responsible for decoding and executing the instructions and storing results of the instructions in a suitable storage unit, such as a register or a memory.

To conserve power, in accordance with an embodiment of the present disclosure, instructions comprising a loop may be fetched and transferred to an instruction queue, rather than the instruction cache. The instruction cache and branch prediction module are not needed during execution of a loop of instructions. Thus, when a loop is detected and the number of iterations through the loop is known, or if the starting and ending points in the loop are known, the instruction cache and branch prediction module may be shut down via clock gating while the instructions for the loop are executed from the instruction queue. When the end of the loop is reached, the instruction cache and branch prediction module may be turned on again, and fetching from the instruction cache may resume. The power saved by executing instructions from an instruction queue, however, is lessened if some types of loops, such as non-syntactical loops, are not detected. The present disclosure allows instructions forming non-syntactical loops to be detected during execution, and handled more efficiently during successive execution of the same instructions. Once a loop has been identified, the present disclosure further allows the instructions of the loop to be captured in the instruction queue and executed from there in order to permit the power savings discussed above.

The instruction queue is the skid buffer for between instruction cache and decode unit to avoid the problems arising from the signal stalling at the decode unit, causing delays to be propagated all the way to the instruction cache and the branch unit. A loop can be captured in the instruction queue as the loop buffer and fetching data from instruction cache may be paused during execution of the loop, as the instructions are stored in the instruction queue before sending to the decode unit. The instruction queue may be sized in order to accommodate 95% of all loop sizes. One advantage of using an instruction queue over the instruction cache is that the instruction cache continuously fetches instructions, a high power consumption activity. The instruction cache thus is one of the units of the processor that consumes the most power.

Figure 2:
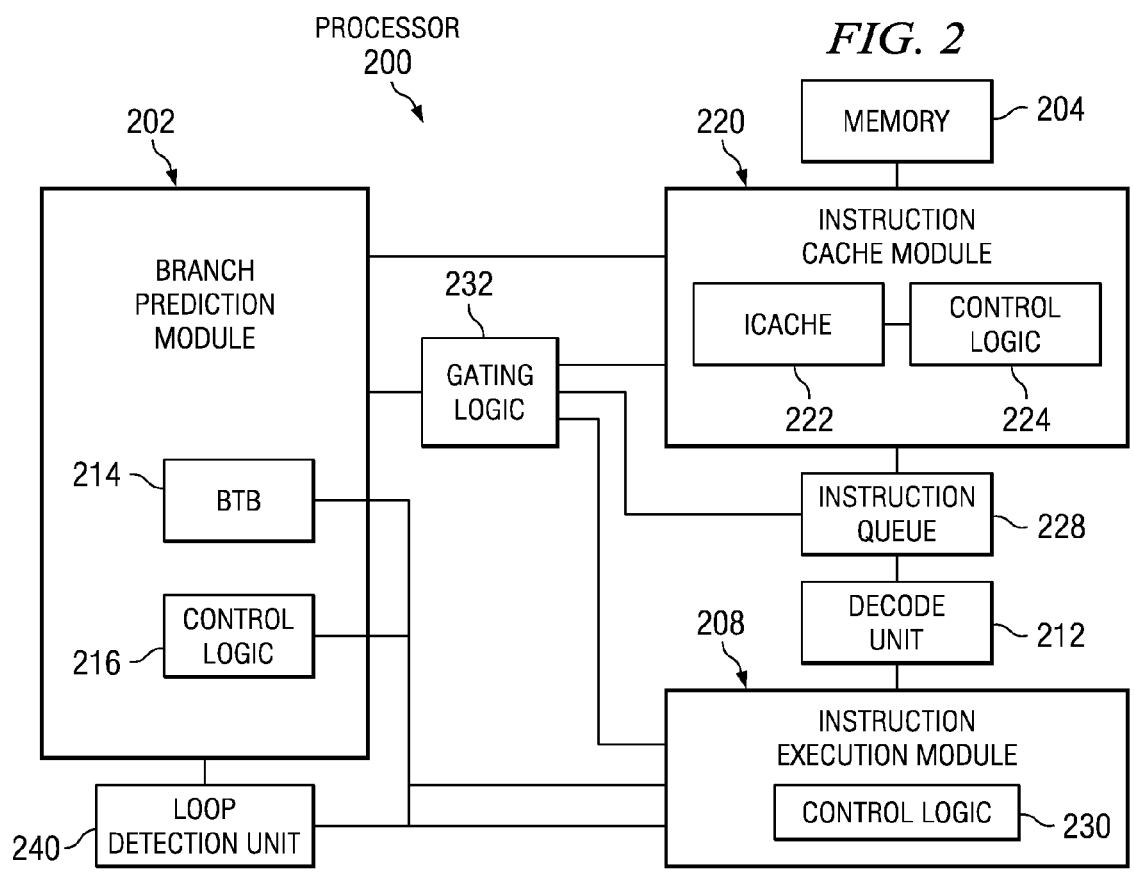
FIG. 2 illustrates a block diagram of a processor system that may be used to implement the technique described herein, in accordance with at least some embodiments.

The instruction queue is a First In, First Out ("FIFO") structure implemented with rotating pointers. A write pointer indicates where to write in the next set of instructions fetched from the instruction cache. The write pointer is incremented after every valid fetch from the instruction cache. A read pointer indicates which instructions are the valid instructions to send to the decode unit. The read pointer is incremented every clock cycle unless the decode unit asserts the stall signal. The write and read pointers are reset to the same value. There may be a bypass path for an instruction to go directly from the instruction cache to the decode unit when the instruction queue is empty, but the instructions from instruction cache are still written into instruction queue. The instructions are retained in the instruction queue until the write pointer rotates to the same location again. As long as the number of instructions in the loop is smaller than instruction queue size, the first instruction of the loop (identified by an offset as the loop start) is still in the instruction queue when the branch (identified as the loop end) is fetched from instruction cache. The target of the conditional branch instruction is the loop start, and the conditional branch instruction itself is the loop end. As shown in FIG. 2 and discussed in greater detail herein, during execution of the loop instructions retained in the instruction queue, the instruction cache 220 and branch prediction module 202 may be shut down using clock gating, thus conserving power.

The technique of the present disclosure may be illustrated in the context of the instruction set shown in FIG. 1. Specifically, FIG. 1 shows a series of instructions forming instruction set 10 on which the technique described herein may be implemented, in accordance with embodiments of the present disclosure. The instruction set 10 may stand alone or may be part of a larger set of executable instructions. The instruction set 10 may be processed multiple times (i.e. the instruction set 10 may be subject to multiple iterations) because, for instance, the instruction set 10 may comprise a loop. The instruction set 10 may be stored in, for example, an instruction cache (shown in FIG. 2 and described below). As shown in FIG. 1, the instruction set 10 may comprise, among other instructions, instructions 100 through 114, corresponding to program counter 0 through N+1, respectively. For illustrative purposes, instruction 102 is the first instruction in an iterative loop. Instruction 102 may begin an iterative loop that is not easily identified by syntax, i.e. a non-syntactical loop. In such a non-syntactical loop, one reliable indication of the existence of the loop is a backward taken conditional branch instruction. Branches actually taken are stored in the branch prediction unit (as described below), as are bits representing the loop indication and loop counter. In the exemplary series of instructions, instruction 112 is the last instruction in the loop, in that when executed, it will either jump back to instruction 102 to continue looping, or will finish the loop by continuing to the next sequential instruction, instruction 114 in this case. For the instruction set shown in FIG. 1, the loop thus includes the instructions from instruction 102 to instruction 112. In some cases, a loop may be nested within another loop, as is well-known in the art, and detecting and handling such nested loops will be discussed further below.

The instruction set 10 may be stored and processed by a processor such as that shown in FIG. 2. Referring to FIG. 2, a processor 200 comprises a branch prediction module 202, an instruction cache module 220, a memory 204, an instruction queue 228, a gating logic 232, an instruction execution module 208, a loop detection unit 240, and a decode unit 212. Alternatively, the memory 204 may be internal to the processor, or a separate unit. The branch prediction module 202 comprises a branch target buffer (BTB) 214, and a control logic 216 capable of controlling the BTB 214. The instruction cache module 220 comprises an instruction cache (icache) 222 and a control logic 224 capable of controlling the icache 222 and other aspects of the instruction cache module 220 as well as interacting with other components of the processor 200 external to the module 220. The instruction execution module 208 comprises an execution unit 234 and control logic 230 capable of controlling the execution unit 234 and other aspects of the instruction execution module 208 as well as interacting with other components of the processor 200 external to the module 208. The gating logic 232 couples to the instruction queue 228, the branch prediction module 202, and the instruction cache module 220. The gating logic 232 is operable to shut down the branch prediction module 202 and the instruction cache module 220 via clock gating in one or more embodiments of the present disclosure, while the decode unit 212 and instruction execution module 208 execute a loop from the instruction queue 228. Alternatively, while the instruction execution module 208 executes a loop from the instruction queue 228, power may be turned off entirely to the branch prediction module 202 and the instruction cache module 220. Turning off these modules during loop execution will be discussed further herein.

The branch prediction module 202 stores historical data that describes the behavior of previously-executed conditional branch instructions. For example, for a set of instructions having a single conditional branch instruction, the branch prediction module 202 stores the address of the branch instruction, as well as the address of the instruction that is executed immediately after the branch instruction, termed the "target address." The instruction that is executed immediately after the conditional branch instruction depends on whether or not the branch in the branch instruction is taken. If, during previous iterations, the branch usually was not taken, then the branch prediction module 202 stores the address of the instruction succeeding the conditional branch instruction. In some embodiments, the branch prediction module 202 may not store the address of such a succeeding instruction, since the next address used is the next sequential address which is generated as if there is no branch instruction in the instruction sequence. Thus, a "not-taken" branch instruction and the complete absence of a branch instruction both would take the same path to the next sequential address (e.g., generated by incrementing the previous address). If, during previous instructions, the branch was usually taken to, for instance, the last instruction in the instruction set, then the branch prediction module 202 stores the address of the last instruction in the instruction set. The address of the instruction executed after the branch instruction is termed the "target address."

In the case of a loop, such as the loop beginning with instruction 102, various data is stored in the branch prediction module 202. More specifically, in an iteration through the instruction set 10, the technique may comprise the loop detection unit 240 storing an entry of one or more bits in the BTB 214 that points to the address of the instruction at the beginning of the loop, in this case instruction 102. With regard to instructions that are not conditional branch instructions, such as instruction 102, the branch prediction module 202 does not store any information. The branch prediction module 202 does store information related to conditional branch instructions, such as instruction 112. For instance, for a branch instruction that is not part of a loop, the branch prediction module 202 stores a program counter and target address for each branch instruction. Under these circumstances, the target address may comprise a 32 bit address.

When the branch instruction is a part of a loop, however, there is no need to store the target address. The branch prediction module 202 stores 1 or more bits to indicate that the instruction is part of the loop (or alternatively a nested loop) and an offset that points to the beginning of the loop (i.e., instruction 102). Additionally, the branch prediction module 202 may store a loop count. Compared with the 32 bit target address stored when not handling a loop, the offset stored is typically less than 32 bits, resulting in the ability to additionally store a loop count in the same space taken up by a 32 bit target address, i.e., without taking up any additional space.

Since the instruction queue 228 is implemented with write and read pointers, the instruction beginning the loop (here instruction 102) is still in the instruction queue 228 when the branch instruction (here instruction 112) is transferred from instruction cache 222 to instruction queue 228. The offset provided by the branch prediction module 202 is used by the instruction queue 228 to set up a start pointer (to instruction 102 in this example) and an end pointer (to instruction 112 in this example).

Referring still to FIG. 2, the processor further comprises a loop detection unit 240. The loop detection unit 240 is operably coupled to the branch prediction module 202 and the instruction execution module 208. The instruction execution module 208 executes instructions provided by the decode unit 212. Upon executing a backward taken conditional branch instruction, the instruction execution module 208 sends the program counter and target address to the loop detection unit 240. The program counter, the target address, and the counter are stored, and subsequently the loop detection unit 240 compares each with the respective corresponding values for a backward taken conditional branch instruction for loop detection. From the loop detection unit 240, each stored program counter, target or counter may be fed back to the branch prediction module 202.

A technique of detecting a loop and assigning pointers in accordance with the present disclosure is further discussed below with reference to FIG. 3. With pointers in place to indicate the start and end of the loop, instructions for the entire loop may be fetched and transferred to the instruction queue 228, where they remain until execution of the loop is complete. While the loop is executing instructions from the instruction queue 228, the instructions may be fetched sequentially. Once the loop has been executed from the instruction queue 228, fetching instructions from the icache 222 resumes and the instructions are transferred into pipeline for execution, i.e. the instruction queue 228, the decode unit 212 and execution unit 208.

The instruction set 10 may be stored in the icache 222. When not handling a loop, the instructions in the instruction set 10 may be fetched, one by one, and transferred to instruction queue 228 and the instruction execution module 208. When handling a loop, the instructions in the instruction set 10 may be fetched and stored in the instruction queue 228, and executed from there. The BTB 214 may store, among other things, data that enables the control logic 216 to perform branch predictions on instructions stored in the icache 222. Although branch prediction is known to those of ordinary skill in the art, further information on branch prediction is disclosed in "Method and System for Branch Prediction," U.S. Pat. No. 6,233,679, which is incorporated herein by reference. As described above, the BTB 214 may store an offset pointing to the beginning of the loop and a loop count relating to a set of instructions comprising an iterative loop.

FIG. 3 illustrates a flow diagram of a technique for detecting and handling a loop described herein, in accordance with at least some embodiments. The method begins with execution through an instruction set (block 300). In an embodiment, the method begins on the first pass through the instruction set, such that loops detected and identified in the first pass may be handled efficiently in subsequent executions of the same set of code. Loop detection according to the present embodiment thus does not lead to efficient handling of every single execution of a given loop, but rather permits more efficient handling of loops after they have been identified, which may occur after the code has been executing for some period of time. Specifically, in an embodiment, the loop detection unit considers instructions not as they are fetched, but rather, once executed.

In block 302, the decode unit 212 decodes an instruction to identify whether the instruction is a conditional branch instruction. In block 302, the instruction execution module 208 executes the conditional branch instruction and identifies whether the branch instruction is backward taken and transfers the program counter (PC) and target address to the loop detection unit 240. The program counter (PC) and target address (i.e. the address of the instruction executed after the branch instruction) are compared to the stored conditional branch instruction for loop detection in block 304. If the instruction is not identified as a backward taken conditional branch instruction, no information is stored relating to the instruction.

In block 304, the next time that the instruction execution module 208 identifies a backward taken conditional branch instruction, the loop detection unit 240 compares the PC and target address that it previously stored (in the previous pass through block 304) with the PC and target address for the newly identified backward taken conditional branch instruction. If the previously stored PC and target address match the PC and target address for the newly identified conditional branch instruction, the stored PC and target address remain the same, and a counter is incremented (block 306) to indicate the number of times the particular branch has occurred. In an embodiment, once the loop is identified and stored in the branch prediction unit 202, it is not detected again, as indicated in block 303.

If the previously stored PC and target address do not match the PC and target address for the newly identified conditional branch instruction, then the loop detection unit 240 will update the bits stored to reflect the PC and target address of the newly identified branch instruction, and reset the counter to zero (block 308). The counter is reset to zero to indicate that a branch to the same address has not occurred and that, at that point in time, it is unlikely that the branch is evidence of a loop. The instruction execution module 208 will continue identifying branch instructions (block 302).

When the counter is incremented (in block 306), the counter is compared to a threshold value (block 310). The comparison reflects that if the same conditional branch instruction is taken from the same address for a certain number of times, a loop likely exists. For example, referring to FIG. 1, if instruction 112 branches to instruction 102 at least 3 times, a loop that repeats at least 3 times through instructions 102-112 likely exists. The threshold value for determining the presence of a loop may be hard-coded or may be programmable. The threshold value may be based on many factors, such as the branch target buffer size, the power expended in each iteration of the loop executed from the instruction cache compared to the power expended in each iteration of the loop executed from the instruction queue, and the like. An optimal value for the threshold value may be determined according to characteristics of the instruction set, the amount of power desired to be saved, and other factors.

If the counter is equal to the threshold value (block 310), in block 312 the loop detection unit 312 sends one or more bits to the branch prediction module 208, including a loop indication and offset pointing to the beginning of the loop. The loop indication and offset are used in setting a pointer back to the beginning of the loop. In an embodiment, if the number of instructions in the loop is greater than the size of the instruction queue, then, for simplicity, the loop is treated as if it is not a loop. In an embodiment, the instruction cache is set to fetch only those instructions that do not fit into the instruction queue.

With offset and loop count predicted and transferred from the branch prediction module 202 to the instruction queue 228, the instruction queue 228 sets up the start pointer and the end pointer, and the instructions for the loop may be fetched, transferred into, and executed directly from the instruction queue 228 (in block 314). While instructions are executed from the instruction queue 228, the branch prediction module 202 and the icache 222 may be shut down by the gating logic 232. Shutting down the modules may comprise employing the clock signal—shutting down the power via clock gating means that power stays on, but the branch prediction module 202 and icache 222 do not receive the clock signal, thereby effectively stopping their operations. Alternatively, in an embodiment of the present invention, shutting off the modules may comprise actually turning off power to the modules. When the end pointer is detected and the instructions in the queue have been executed, the branch prediction module 202 and icache 222 may be turned back on, either by clock gating or restoring power.

Various embodiments of the present disclosure similarly handle nested loops. A nested loop here refers to at least one loop within a loop, i.e. an inner loop within the body of an outer loop. The first pass of the outer loop triggers the inner loop, which executes to completion, the second pass of the outer loop triggers the inner loop again, repeating until the outer loop finishes. According to embodiments of the present disclosure, a loop within another loop may be detected and efficiently handled in the instruction queue.

Figure 4:
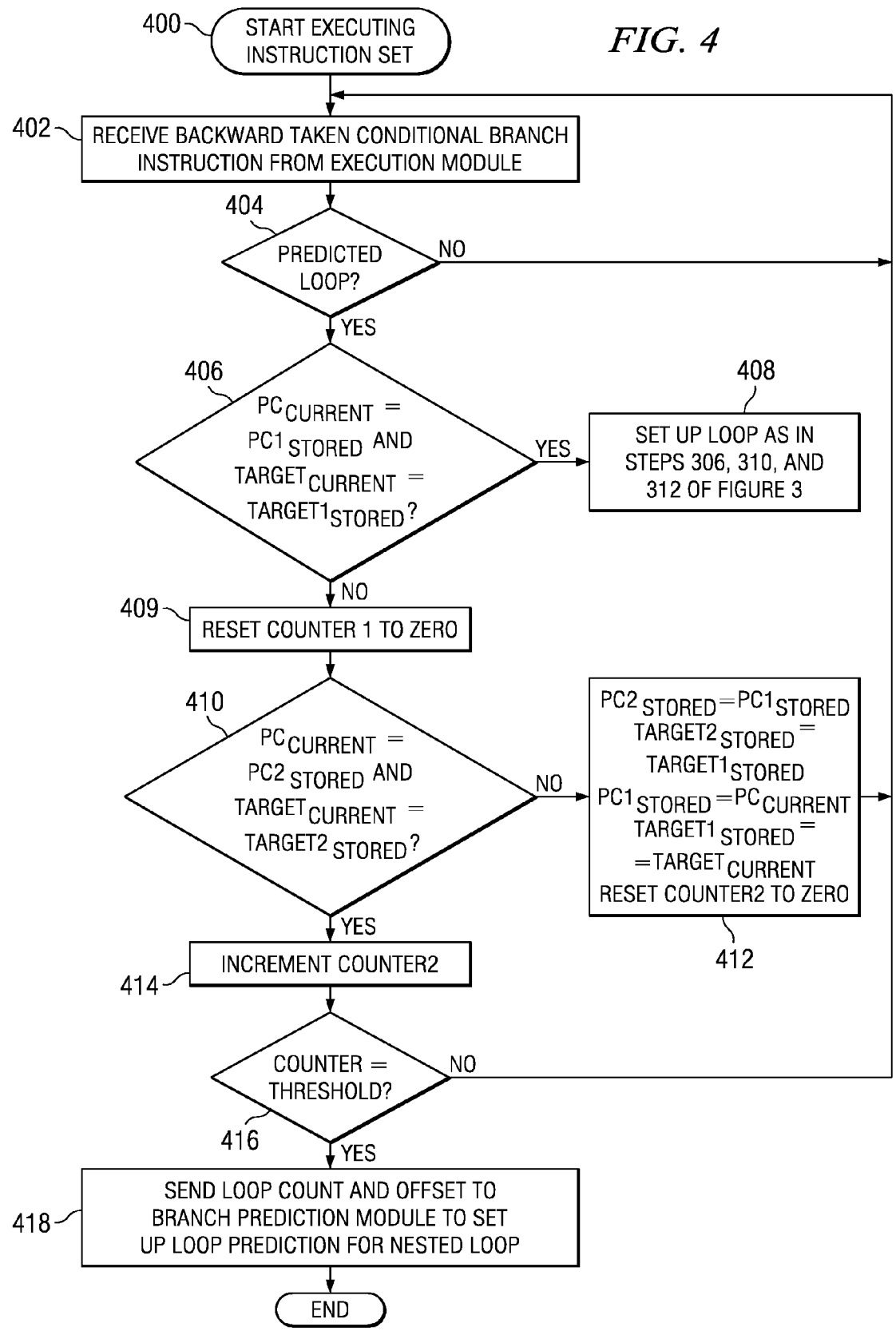
FIG. 4 shows a flow diagram of a technique for detecting and handling a nested loop in accordance with at least some embodiments.

FIG. 4 shows a flow diagram of a technique for detecting and handling a nested loop in accordance with at least some embodiments. While executing an instruction set (block 400), the backward taken conditional branch instruction is identified (block 402) and stored in the branch prediction module 202 as discussed above. The backward taken conditional branch instruction is bypassed (block 404) if it has been detected on an earlier pass.

In blocks 406 and 408, the loop detection unit 240 compares the PC and target address in order to detect an inner loop, in accordance with the discussion above with respect to FIG. 3. In block 406, if the current PC and target address do not match with the stored inner loop PC and target address (which may be referred to as PC1 and Target1), then the inner loop counter (counter1) is reset to zero (block 409). In block 410, the current PC and target address are compared to the outer loop PC and target address (which may be referred to as PC2 and Target2). If the current PC and target address match with the outer loop PC and target address, the outer loop count is incremented in block 414. The outer loop count is compared to the outer loop threshold in block 416 to set up the loop prediction for the outer loop to be sent to branch prediction module 202 in block 418.

If both previously stored PCs and target addresses (i.e., PC1, Target 1, PC2 and Target 2, respectively) do not match the current PC and target address for the newly identified backward taken conditional branch instruction, the detection logic unit 240 will 1) reassign and store the inner loop PC and target address to the outer loop PC, 2) reassign and store the target address and the current PC and target address of the newly identified branch instruction to the inner loop PC and target address, and 3) reset the outer loop counter to zero (block 410). Under these circumstances, the outer loop counter is reset to zero to indicate that a branch to the same address has not occurred and that, at that point in time, it is unlikely that the particular identified conditional branch instruction is evidence of an outer loop.

For example, in an embodiment in accordance with the present disclosure, the first time through the nested loop, the inner loop is identified by PC1 and Target1, and then the outer loop is encountered. At this time, the outer loop is set to PC1 and Target1, while the inner loop is set to PC2 and Target2. On the second time through the nested loop, the inner loop is again identified and sets up as PC1 and Target1 while the outer loop is set up as PC2 and Target2. On subsequent passes through the nested loop, the outer loop is established with the outer loop count and nested loop information is sent to branch prediction module 202 to set up pointers defining the outer loop.

In another exemplary embodiment, a single set of store PC and Target may be used to identify the outer loop. When the inner loop is already predicted, as long as the PC is greater than or equal to the inner loop PC, and the offset is greater than or equal to the offset of inner loop, then the outer loop is detected.

When the outer loop counter is incremented (in block 414), the counter is compared to a threshold value indicative of a potential outer loop (block 416). The threshold value for determining the presence of an outer loop may be hard coded or may be programmable. The threshold value may be set high or low, depending on many factors, such as how many loops there are in the entire instruction set, the amount of power expended in each iteration of the loop executed from the instruction cache compared to the power expended by each iteration of the loop executed from the instruction queue, and the like. An optimal value for the threshold value may be determined according to characteristics of the instruction set, the amount of power desired to be saved, and other factors.

If the outer loop counter is equal to the threshold value in block 416, in block 418 the loop detection unit 240 sends the loop count and the offset to the branch prediction module 202.

The instruction queue 228 may comprise a start pointer and an end pointer for each of the outer and inner loops. Any time that the branch prediction module 202 detects the start pointer of the outer loop, the instructions for the outer loop may be fetched, transferred into, and executed directly from the instruction queue 228 (in block 418), and thereby, the instructions for the inner loop are also captured in the instruction queue 228. When the start pointer for the inner loop is detected, the instructions for the inner loop are already in the instruction queue 228 and are executed from there without requiring additional fetching. When the end pointer for the inner loop is detected, and the inner loop is finished executing, execution of the outer loop resumes. It is assumed that the instruction queue 228 is large enough to hold both outer and inner loop instructions.

When the end pointer of the outer loop is detected and the outer loop has been executed, the branch prediction module 202 and icache 222 may be turned back on, and instructions resume execution from the icache 222, until reaching a pointer to the start of the outer loop or until detection of another loop nested within the outer loop.

Nested loops with any number of inner loops may be handled in this manner. For each loop within a loop, loop detection according to the present disclosure is performed, a counter is incremented to indicate the number of iterations through the loop, and start and end pointers are set in place.

FIG. 5 shows an illustrative embodiment of a system comprising the features described above. The embodiment of FIG. 5 comprises a battery-operated, wireless communication device 515. As shown, the communication device 515 includes an integrated keypad 512 and a display 514. The processor 200 may be included in an electronic package 510 which may be coupled to keypad 512, display 514 and a radio frequency (RF) transceiver 516. The RF circuitry 516 preferably is coupled to an antenna 518 to transmit and/or receive wireless communications. In some embodiments, the communication device 515 comprises a cellular (e.g., mobile) telephone.

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a pipeline in which a plurality of instructions are processed;
   an execution unit coupled to the pipeline;
   an instruction cache coupled to the pipeline;
   a branch prediction module;
   a fetch unit, coupled to the pipeline, for placing instructions for a loop in an instruction queue; and
   detection logic, coupled to the pipeline, for:
      identifying a conditional branch instruction having a program counter and a target address;
      incrementing a loop count when the program counter and the target address equal a stored program counter and a stored target address; and
      detecting a loop when the loop count equals a threshold value.

2. The system of claim 1, wherein the system comprises at least one of a battery-operated device and a wireless device.

3. The system of claim 1, wherein the branch prediction module stores the loop count and an offset to a start of the loop in place of the target address for a non-conditional branch instruction.

4. The system of claim 1, wherein the instruction queue sets up a start pointer and an end pointers to execute the instructions for the loop instructions solely from instruction queue.

5. The system of claim 1, wherein the instruction queue sets up a start pointer and an end pointers to execute the instructions for the loop solely from instruction queue, wherein the loop comprises a nested loop.

6. The system of claim 1, wherein the detection logic further assigns an offset to a start of the loop; and executes instructions from the instruction queue for the loop of instructions defined by the start pointer and the end pointer.

7. The system of claim 1, wherein the detection logic is further detects one or more nested loops; maintain a loop count for each nested loop; and assign one or more pointers to define a start and an end of the loop for each nested loop.

8. The system of claim 1, further comprising gating logic that shuts down the branch prediction module and the instruction cache while the execution unit executes the loop from the instruction queue.

9. A processor, comprising:
   memory;
   a fetch logic for fetching one or more instructions from the memory;
   an instruction queue for receiving one or more loop instructions;
   an execution unit for executing a loop from the instruction queue;
   detection logic for detecting a loop in the plurality of instructions when a loop counter equals a threshold value, the detection logic comprising:
      branch prediction logic for identifying one or more conditional branch instructions, each conditional branch instruction having a program counter and a target address; and
      increment logic adapted increment the loop counter when the program counter and the target address are equal to a stored program counter and a stored target address.

10. The processor of claim 9, further comprising gating logic for shutting down the branch prediction logic and the fetch logic while the execution unit executes the loop from the instruction queue.

11. The processor of claim 9, wherein the fetch logic fetches instructions for a loop and place the instructions for the loop in the instruction queue for execution.

12. The processor of claim 9, wherein the detection logic detects one or more nested loops in the plurality of instructions and the execution unit executes the nested loop from the instruction queue.

13. The processor of claim 9, wherein the branch prediction module stores the loop count and offset for loop prediction in place of a target address for a non-conditional branch instruction.

14. A method, comprising:
   identifying a conditional branch instruction having a program counter and a target address;
   incrementing a loop count each time the program counter and the target address equal a stored program counter and a stored target address;
   assigning an offset to start of the loop when the loop count is equal to a threshold value; and
   capturing instructions for a loop in an instruction queue, the loop defined by a start loop pointer and a end loop pointer.

15. The method of claim 14, wherein the threshold number is hard coded.

16. The method of claim 14, wherein the threshold number is programmable.

17. The method of claim 14, wherein capturing instructions further comprises:
   fetching instructions for the loop from a cache; and
   placing instructions for the loop in the instruction queue.

18. The method of claim 14, further comprising shutting down one or more modules while executing instructions from the instruction queue.

19. The method of claim 14, further comprising:
   having set a start pointer, identifying a second conditional branch instruction having a second program counter and a second target address;
   incrementing an outer loop count each time the second program counter and the second target address equal an outer loop stored program counter and an outer loop stored target address;
   assigning a start outer loop pointer and an end outer loop pointer when the inner loop count is equal to a second threshold value; and
   executing the instructions for an outer loop from the instruction queue, the outer loop defined by the start outer loop pointer and the end outer loop pointer.

* * * * *